Aug. 25, 1925.  
C. LE G. FORTESCUE  
1,551,301  
NEGATIVE PHASE SEQUENCE BOOSTER FOR UNBALANCED LINES  
Filed Dec. 11, 1922
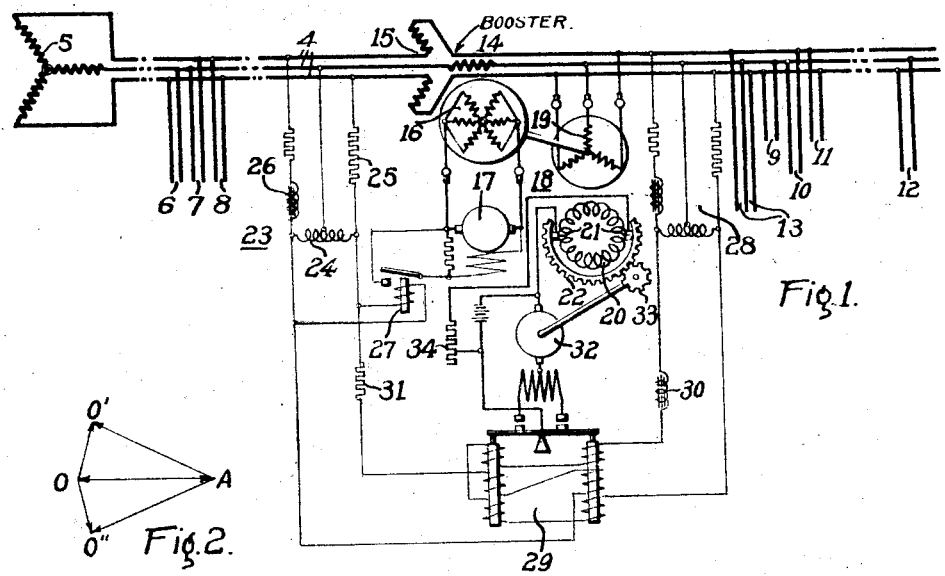
Fig.1.
Fig.2.
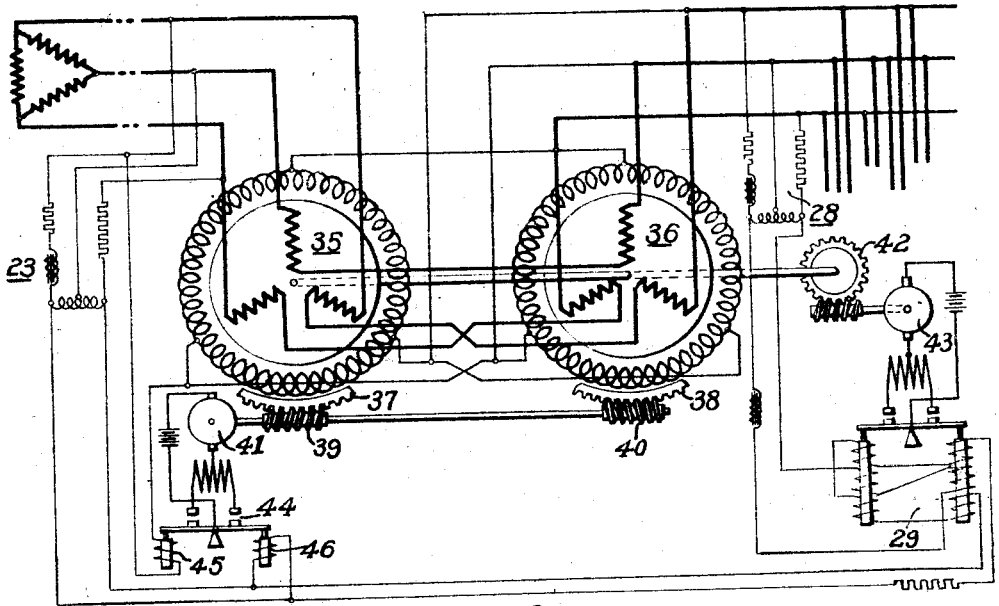
Fig.3.
WITNESSES:  
A.G. Schiefelbein  
O.B. Buchanan
INVENTOR  
Charles Le G. Fortescue.  
BY  
Wesley G. Carr  
ATTORNEY Patented Aug. 25, 1925.

1,551,301

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

NEGATIVE-PHASE-SEQUENCE BOOSTER FOR UNBALANCED LINES.

Application filed December 11, 1922. Serial No. 606,143.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Negative - Phase - Sequence Boosters for Unbalanced Lines, of which the following is a specification.

My invention relates to a booster system particularly adapted for long transmission lines supplying unbalanced loads, whereby the unbalanced voltage drops in the lines produce unbalanced voltages at the load points. My invention relates to booster means for balancing the voltages of a line while permitting the flow of the unbalanced load currents.

The specific details of my invention will be described and claimed in the following specification, having reference to the accompanying drawing, wherein, Figure 1 is a diagrammatic view of apparatus and circuits embodying my invention in a system utilizing a dynamo-electric booster driven backwardly under such conditions that negative-phase-sequence currents are permitted to flow therethrough and the negative-phase-sequence voltages generated therein are substantially equal and opposite to the negative-phase-sequence voltage component of the line.

Fig. 2 is a vector diagram which will be referred to in the explanation of my invention.

Fig. 3 is a view similar to Fig. 1 but showing a modification employing induction regulators to perform the booster function.

In the drawing is shown a long three-phase transmission line 4, supplied from a source 5, and having a plurality of single-phase feeders 6, 7, 8, 9, 10, 11 and 12 connected at different points. It is assumed that the single-phase loads are not balanced, so that there will be a resultant unbalance in the line voltages. At a certain point in the line, for example, where a polyphase feeder 13 is connected, it is desired to cause the line voltages to be balanced while permitting the unbalanced load currents to be supplied by the source 5.

In order to produce the desired voltage balance in the line, I have shown, in Fig. 1, a booster machine 14, having a three-phase primary winding 15 connected in series-circuit relation to the line and having a relatively rotating secondary member illustrated as carrying a combined damper and unidirectional exciting winding 16 which is energized from a small exciter 17. The booster machine is designed with a very small air gap in order that the magnetic coupling between the primary and secondary members may be as perfect as possible.

The rotor member of the booster 14 is driven at synchronous speed in the backward direction by any suitable means, illustrated in the present case as a three-phase synchronous machine 18 having a primary winding 19 connected across the line and having an exciting winding 20, shown as the stator winding and provided with a commutator cylinder upon which bear two brushes 21 mounted upon a rocking brush holder 22, whereby the angular position of the synchronously rotating rotor member may be controlled. While I have illustrated a synchronous motor adapted to assume different angular positions relative to its synchronously rotating magnetic field, in order to vary the torque supplied to the booster, it will be understood that any other motor adapted to operate at synchronous speed and to deliver a variable torque which may be readily controlled, whereby the angular position of the booster rotor may be regulated, may be employed without departing from the broader features of my invention.

Referring to Fig. 2, if OA represents the negative-phase-sequence line voltage, in phase and magnitude, and if the booster voltage is adjusted to have the same magnitude, the resultant negative-phase-sequence voltage in the line will be balanced only in case the booster voltage is in phase opposition to the component OA. Thus, if AO represents the booster voltage, the negative-phase-sequence voltage component in the line is neutralized. If the booster voltage lags behind the phase position it should have, as indicated at AO′, a resultant voltage OO′ will be produced in the line, said resultant voltage OO′ having a component which leads the original negative-phase-sequence line voltage OA by 90°. On the other hand, if the booster voltage is in advance of the phase position it should have, as indicated at AO″, a resultant negative-phase-sequence line voltage OO″ will be produced having a component which lags behind the original negative-phase-sequence voltage component of the line by 90°.

It is thus evident that, if the voltage of the booster is maintained at all times equal in magnitude to the negative-phase-sequence line voltage component, the phase position of the booster may then be adjusted until balanced-voltage conditions obtain in the line. The adjustment may be made by hand or it may be made by automatic electro-responsive apparatus which responds to the relative phase positions of the resultant negative-phase-sequence line voltages.

In Fig. 1 is shown a static network 23, comprising an auto-transformer 24 having a mid-tap directly connected to one of the conductors of the line 4 on the unbalanced side of the booster, that is, the side nearest the source 5. The two terminals of the auto transformer 24 are connected, through a resistor 25 and a combined resistance and inductance device 26, respectively, to the two remaining conductors of the line 4, thus deriving a voltage at the terminals of the auto transformer which is proportional, in relative phase and magnitude, to the negative-phase-sequence line voltage. While I have illustrated one particular form of apparatus for measuring the negative-phase-sequence voltage component, I do not desire to be limited to this or to any other particular form of such apparatus, the drawings being intended as symbolic of any negative-phase-sequence measuring system.

To measure negative-phase-sequence line voltage, the current traversing the resistor 25, which is in phase with the positive-phase-sequence line voltage in that phase, is balanced against the current traversing the combined resistance and inductance device 26 which is connected across the phase having a positive-phase-sequence voltage lagging 120° behind the voltage across the resistor 25. The total impedance of the device 26 equals that of the resistor 25, so that the currents obtained with equal voltages are equal. The ratio of inductance to resistance in the device 26 is such that the current lags 60° behind the impressed voltage. Hence, for balanced positive-phase-sequence line voltages, the currents in the two halves of the auto transformer 24 are equal and displaced 120°+60°=180° from one another, and no voltage appears across the auto transformer by reason of balanced positive-phase-sequence line voltages. For negative-phase-sequence line voltages, the phase that was lagging will be leading, and the auto-transformer currents will be displaced in the leading direction 120°—60°=60°. There will thus be a voltage across the auto transformer proportional to the phase and the magnitude of the negative-phase-sequence line voltage.

The static network per se constitutes the subject-matter of the specification and claims of Patent No. 1,535,587, granted April 28, 1925, to Robert D. Evans, on application Serial No. 358,440, filed Feb. 13, 1920, and assigned to the Westinghouse Electric and Manufacturing Co.

The excitation of the exciter 17, which controls the voltage of the booster 14, is governed by means of any regulating apparatus, indicated symbolically at 27, whereby the booster voltage is maintained substantially equal, in magnitude, to the negative-phase-sequence line voltage as measured by the static network 23.

The phase of the booster voltage is controlled by deriving a voltage which is responsive, in phase and in magnitude, to the resultant negative-phase-sequence line voltage, a second network 28, similar to the network 23, being shown for this purpose. Any suitable phase-indicating relay 29 is then employed to indicate the component of the resultant voltage which is in quadrature relation to the original negative-phase-sequence voltage of the line, the quadrature relation being obtained by interposing a choke coil 30 in series with one of the negative-phase-sequence networks, and a resistor 31 in series with the other. The phase-indicating apparatus 29 operates to energize a small regulating motor 32, in the one direction or the other, in accordance with the phase of the resultant negative-phase-sequence line voltage, in order to adjust the position of the rotating brush holder 22, and hence also adjusting the torque delivered to the booster 14 by the synchronous motor 18, by means of any suitable mechanism, such as a gear mechanism 33.

In operation, the motor 18 supplies such torque to the booster 14 that the booster "draws," or permits the flow of, negative-phase-sequence currents of the proper phase and magnitude to supply the negative-phase-sequence load currents, while the line voltages on the side of the booster remote from the source are substantially balanced. Booster apparatus, such as is shown, may be placed in the line at as many points as may be desired in order to restore balanced voltage conditions at the several distributing points along the line. The synchronous machine 18 may be employed, at the same time, to supply wattless positive-phase-sequence current to the line, or to control the positive-phase-sequence line voltage, thereby utilizing the positive-phase-sequence impedance of the booster to facilitate the voltage regulation of the line by means of the synchronous machine 18, a rheostat 34 being shown in the exciting circuit of the synchronous machine 18 for this purpose.

In Fig. 3 is shown a similar system employing, in lieu of the dynamo-electric booster 14, an induction regulator aggregate comprising a pair of polyphase induction regulators 35 and 36 which are combined substantially as shown and claimed in my co-pending application, Serial No. 446,416, filed February 19, 1921.

The induction regulators 35 and 36 have their primary windings energized in parallel across the line from the balanced side thereof. The secondary members are connected in phase opposition in series with the line, being connected to the several conductors of the line in the reverse phase-sequence, whereby negative-phase-sequence voltages are supplied to the line.

The primary members of the induction regulators are mounted upon cradles 37 and 38 which are adapted to be simultaneously rocked in opposite directions by means of the right and left-hand worms 39 and 40, which are driven by a small regulating motor 41, whereby the magnitude of the booster voltage may be varied without affecting the phase position thereof. The secondary members of the induction regulators are both mounted upon the same shaft and driven, through suitable gear-and-worm mechanism 42, by a small regulating motor 43, whereby the phase position of the booster voltage may be varied without affecting the magnitude thereof.

Suitable devices for deriving the negative-phase-sequence line-voltage components on the two sides of the booster are shown at 23 and 28, as in Fig. 1. The small regulating motor 41 for controlling the magnitude of the booster voltage is controlled by means of a relay 44 having a coil 45, energized by the booster voltage in one phase, and an opposing coil 46, energized in accordance with the negative-phase-sequence line-voltage component on the unbalanced side of the booster. While the coil 45 is shown as being connected to one phase only of the booster voltage, it will be understood that a negative-phase-sequence voltage network may be employed, if necessary for greater accuracy, in order to eliminate the effects of the positive-phase-sequence voltage drops in the booster mechanism.

The regulating motor 43 which controls the phase position of the booster voltage is controlled, as in Fig. 1, by means of any suitable phase-indicating relay 29, as illustrated. As the operation of the apparatus shown in Fig. 3 is substantially similar to that shown in Fig. 1, no further explanation is believed necessary.

While I have described certain characteristics of my invention in detail, and while I have pointed out certain of the most obvious principles and purposes thereof, I do not intend that the language employed in the following claims shall be limited to the precise features described, but I intend that the claims shall be construed to cover all modifications which are fairly comprehended by the language thereof, when read in connection with the prior art, regardless of the details and functions mentioned in the description or illustrated in the drawing.

I claim as my invention:

1. The combination with a negative-phase-sequence polyphase booster adapted to balance the voltages of an unbalanced polyphase line, of means responsive to the magnitude of the negative-phase-sequence voltage component on the unbalanced side of the booster for automatically controlling the magnitude of the booster voltage, and means responsive to the relative phases of the negative-phase-sequence voltage components on both sides of the booster for automatically controlling the phase of the booster voltage.

2. The combination with a negative-phase-sequence polyphase booster adapted to balance the voltages of an unbalanced polyphase line, of electro-responsive means for adjusting the magnitude of the booster voltage to be substantially equal to the magnitude of the negative-phase-sequence voltage component of the line, an electro-responsive means for adjusting the phase of the booster voltage in substantial opposition to the phase of the negative-phase-sequence line voltage component.

3. The combination with a polyphase system having positive and negative phase-sequence components of a polyphase electrical quantity, of a series booster for substantially neutralizing one of said components, said last-mentioned component having a variable phase characteristic and a variable voltage characteristic, quick-acting means responsive to one of said characteristics for automatically adjusting an electrical quantity in said booster, and means responsive to the other of said characteristics for then adjusting a second quantity in said booster.

4. The combination with a source of polyphase energy, a transmission line and an unbalanced load resolvable into positive and negative phase-sequence components, of a booster comprising a series-connected element for supplying negative-phase-sequence voltages to the line and a parallel-connected element for deriving positive-phase-sequence currents from the line, means responsive to the phase of the negative-phase-sequence voltage component at a predetermined point in said line for automatically maintaining the phase of the booster voltage in alignment therewith, and electro-responsive means for adjusting the magnitude of the booster voltage to maintain substantially balanced voltage conditions at said predetermined point.

5. The combination with a source of polyphase energy, a transmission line and an unbalanced load resolvable into positive and negative phase-sequence components, of a booster comprising a synchronous dynamo-electric machine having its primary winding connected in series with said line at a predetermined point to balance the voltages at said point, said machine having a unidirectional exciting winding and damping means rotating in synchronism with the negative-phase-sequence currents, means for applying a mechanical torque to said machine, means responsive to the magnitude of the negative-phase-sequence line voltage component at the balancer on the side towards said source for automatically adjusting the excitation of said machine, and means responsive to the line voltage conditions on the opposite side of said machine for automatically adjusting said torque, whereby balanced line voltage conditions are maintained on said opposite side of said machine.

6. The combination with a source of polyphase energy, a transmission line and an unbalanced load resolvable into positive and negative phase-sequence components, of a booster comprising a series-connected element for supplying negative-phase-sequence voltages to the line and a parallel-connected element for deriving positive-phase-sequence currents from the line, and electro-responsive means for automatically regulating the booster to substantially balance the line voltages on the side of the booster remote from the source.

7. The combination with a polyphase source, of a transmitting line, unbalanced load apparatus connected to said line, said line having an appreciable impedance causing unbalanced line voltages by reason of the unbalanced line currents supplied to said load, a negative-phase-sequence booster interposed in said line at a point remote from said source and between said load and said source, and electro-responsive means for automatically regulating the booster to substantially balance the line voltages on the side of the booster remote from the source.

8. The combination with a polyphase line having positive and negative phase-sequence voltage components, of a source of energy therefor, unbalanced load apparatus supplied thereby, a backwardly running synchronous dynamo-electric booster machine interposed in said line between said load and said source, a synchronous machine connected across said line on the side of the booster remote from the source, a torque-transmitting connection between the rotors of the two machines, and electro-responsive means for automatically regulating the booster to substantially balance the line voltages on the side of the booster remote from the source.

In testimony whereof, I have hereunto subscribed my name this 6th day of December, 1922.

CHARLES LE G. FORTESCUE.